United States Patent

[11] 3,623,107

| [72] | Inventor | Robert T. Holdren, III<br>Pocomoke, Md. |
|---|---|---|
| [21] | Appl. No. | 23,532 |
| [22] | Filed | Mar. 30, 1970 |
| [45] | Patented | Nov. 23, 1971 |
| [73] | Assignee | The United States of America as represented by the Administrator of the National Aeronautics and Space Administration |

[54] RADAR CALIBRATION SPHERE
5 Claims, 6 Drawing Figs.

[52] U.S. Cl. .................................... 343/706, 343/912
[51] Int. Cl. ........................................ H01q 1/28
[50] Field of Search ........................... 343/18, 706, 911, 912, 916

[56] References Cited
UNITED STATES PATENTS

| 2,460,274 | 2/1949 | Benioff .................... | 343/18 |
| 3,430,245 | 2/1969 | Wolcott .................... | 343/909 |
| 3,248,689 | 4/1966 | Shomphe et al. .......... | 343/709 |

FOREIGN PATENTS

| 735,626 | 5/1966 | Canada ..................... | 343/18 |

OTHER REFERENCES
NRL Report 4843, May 25, 1960, pp. 7–13 Copy 343–911 L

Primary Examiner—Eli Lieberman
Attorneys—Howard J. Osborn, G. T. McCoy and Wallace J. Nelson ABSTRACT: A firm, lightweight, conductive-coated, plastics sphere adapted for launching by a gas filled balloon or the like for radar tracking and calibration.

INVENTOR.
ROBERT T. HOLDREN, III
BY
*Wallace Nilson*
ATTORNEYS

RADAR CALIBRATION SPHERE

ORIGIN OF THE INVENTION

This invention was made by an employee of the National Aeronautics and Space Administration and may be manufactured and used by or for the Government of the United States without the payment of any royalties thereon or therefor.

Radar calibration personnel have long been seeking a rigid, lightweight, economical, large diameter calibration sphere which can be balloon borne within FAA flight restrictions for the purpose of obtaining an exact radar target echo with little or no scintillation.

Previously, radar personnel have utilized aluminum spheres, pressed from aluminum sheet metal or other types of reflectors ranging in size from 6 to 12 inches in diameter for radar calibration and tracking. By utilizing this calibration procedure, the cross-sectional area of an unknown object can be determined by radar. Standard calibration targets can also be used to rapidly evaluate the performance of radar by comparing actual signal return at the radar with theoretical signal strength from the standard sphere.

These previously used small diameter spheres limit the accuracies obtained and are expensive, costing approximately 90 dollars each for 9-inch diameter spheres. A 20-inch sphere of this type would cost approximately 300 dollars and would weigh at least 14 pounds. The small diameter spheres limit the accuracy of radar calibration and the high cost and weight factor of the larger diameter spheres are considered major disadvantages of these prior art calibration devices. Some research has been directed toward inflatable calibration spheres but these for the most part have been found to be impractical.

It is therefore an object of the present invention to provide a firm, lightweight, balloon borne, radar calibration target.

Another object of the present invention is to provide a low-cost radar calibration sphere for obtaining an exact target echo with little or no scintillation.

Another object of the present invention is an improved radar tracking and calibration target.

Another object of the present invention is a process of making radar calibration spheres in various diameters to accommodate the frequency bands associated with various radars.

Another object of the present invention is a process of making lightweight radar calibration spheres with different types of conductive surfaces.

Another object of the present invention is to provide lightweight, balloon borne, standard radar targets ranging from 8 to 30 inches in diameter.

According to the present invention, the foregoing and other objects are attained by providing a radar calibration sphere formed of an expandable lightweight plastics and provided with a conductive coating thereon. These spheres are formed by molding hemispherical sections from commercially available polystyrene beads that have been preexpanded to about 10 times their original size in a preheated machine. After cooling, the expanded beads are placed in a hemispherical mold where final expansion occurs as the beads are subjected to high steam temperature and pressure to form a hemisphere. Two hemispheres, each being designed with interlocking lips, are fastened together with a suitable epoxy cement resulting in a rigid sphere of exact diameter with an approximate seven-sixteenth of an inch wall thickness. Various coatings are employed to seal and coat the plastic sphere so that it will have the conductivity and reflectivity desirable for radar tracking and calibration. A coated sphere is assembled for launching by inserting an aluminum rod through its center and attaching the rod to a gas filled balloon by a nylon cord or the like. Each sphere is also provided with suitable holes therein to maintain equalized and external atmospheric pressure on the sphere for all altitudes.

A more complete appreciation and many of the inherent advantages thereof will be more clearly understood by reference to the following detailed description when considered in connection with the accompanying drawings wherein.

Figure 1:
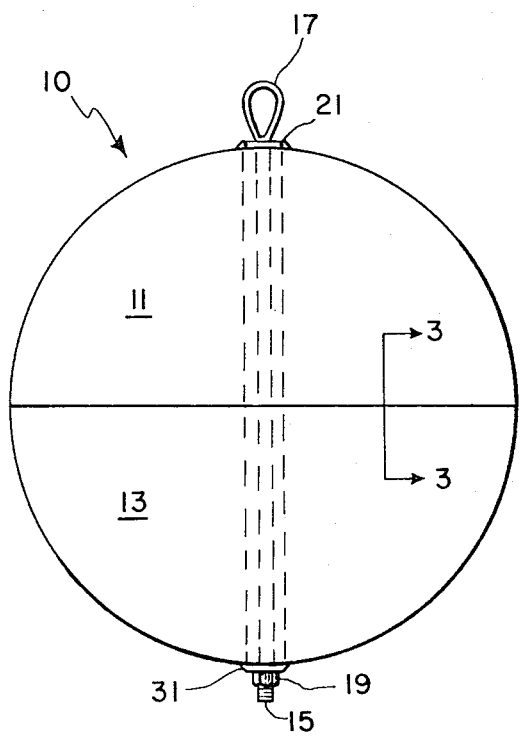
FIG. 1 is a view of a complete sphere according to the present invention when assembled for launch.
Figure 4:
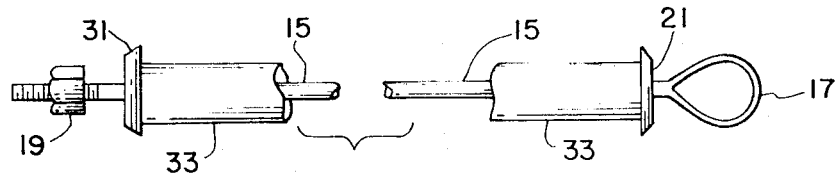
FIG. 4 is a view of the rod assembly mechanism utilized in launching the radar calibration sphere of the present invention.

Referring now to the drawings wherein like numerals designate identical or corresponding parts throughout the several views, and more particularly to FIG. 1, there is shown a lightweight radar calibration sphere according to the present invention and generally designated by reference numeral 10. Sphere 10 is formed of two hemispherical halves 11 and 13 of firm plastics material. A suitable lightweight bolt 15 extends through the center of sphere 10 and serves as attachment mechanism for attaching sphere 10 to a launch balloon or the like. Bolt 15 is provided with a closed loop 17 at one end thereof for attaching the assembly to a balloon, with the other end of the bolt 15 being threaded to receive a suitable tap 19. A pair of disk spacers 21 and 31 are provided, respectively, between loop 17 and sphere 10 and between nut 19 and sphere 10. Spacers 21 and 31 are adapted to bear against sphere 10 and against opposite ends of lightweight tube 33 (FIG. 4), disposed about rod 15 and within sphere 10, to distribute the load forces on sphere 10 during launch operations.

Figure 2:
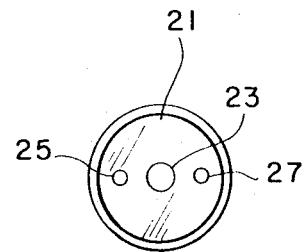
FIG. 2 is a view of one of the disk spacers employed on the sphere shown in FIG. 1.

Referring now to FIG. 2, the details of disk spacer 21 will now be described. As shown therein, spacer 21 is provided with a central opening 23 therein for receiving rod 15. A pair of smaller openings 25 and 27 are disposed 180° apart on disk spacer 21 and serve to communicate with identical sized openings in sphere 10 (not shown). These openings 25 and 27 and those in sphere 10, not shown, insure that the interior of sphere 10 and the exterior thereof are subject to equalized atmospheric pressure at all heights during radar calibration.

Figure 3A:
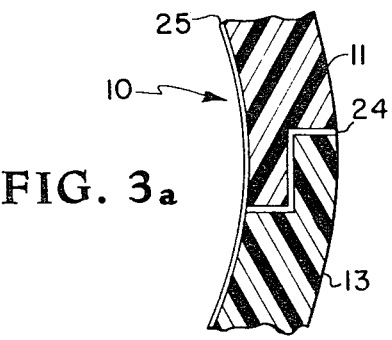
FIG. 3a is a sectional of the sphere shown in FIG. 1 and taken along lines 3—3 of FIG. 1.
Figure 3B:
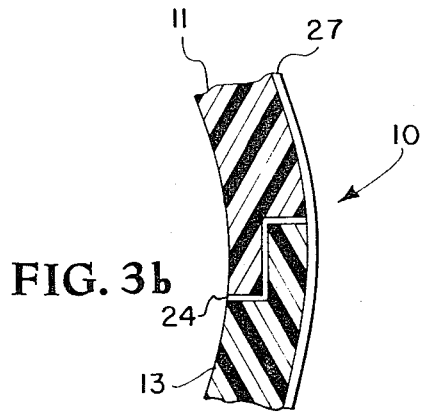
FIG. 3b is a view similar to FIG. 3a but showing a modification of the invention.

Referring to FIGS. 3a and 3b it is seen that hemispherical halves 11 and 13 are formed as molded to produce stepped interlocking lip surfaces. These surfaces are joined together by a suitable adhesive layer 24, such for example, an epoxy resin. Calibration spheres 10 may be provided with an internal conductive coating 25 (FIG. 3a) or an external conductive coating 27 (FIG. 3b). Obviously, when employing internal layer 25 as the conductive surface this layer is applied to the hemispherical sections 11 and 13 prior to assembly of sphere 10. When employing external conductive layer 27 the coating may be applied to the hemispherical sections 11 and 13 prior to joining them together to form sphere 10 or the entire sphere 10 may be coated after being joined together. Various processes for applying conductive coatings to sphere 10 will be more fully described hereinafter.

PROCESS OF MAKING SPHERES

Figure 5:
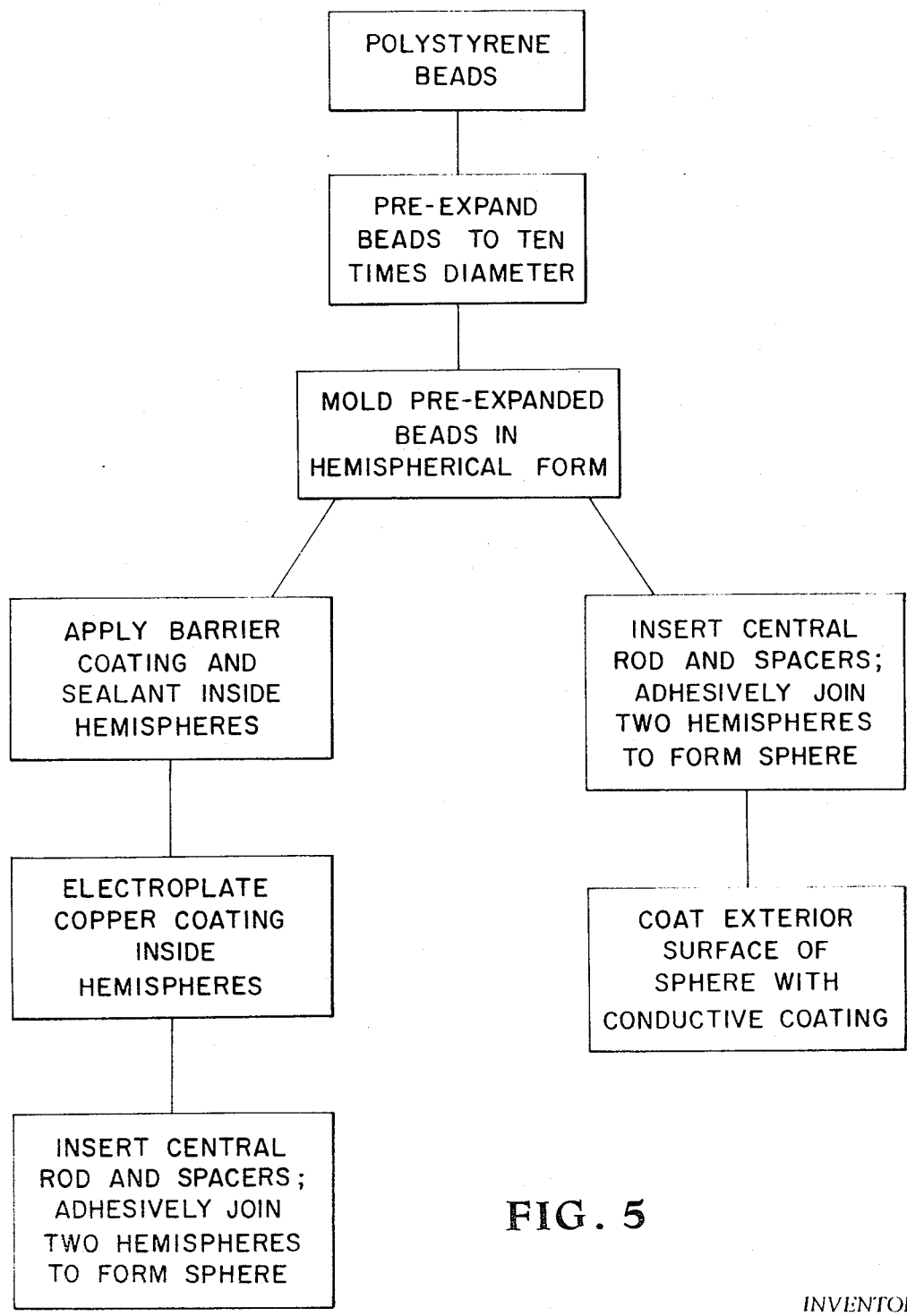
FIG. 5 is a flow chart detailing the process for making the spheres in accordance with the present invention.

Referring now to the flow chart shown in FIG. 5, the process for making lightweight spheres 10 will now be described. Evaluation of various plastics results in the selection of expandable polystyrene beads to mold hemispherical sections 11 and 13. These beads are commercially available from the Sinclair-Koppers Company, Inc., of Pittsburgh, Pa., under the trade name of Dylite Expandable Polystyrene. The beads are manufactured in various sizes and designated by the manufacturer by the letters "A" through "F," according to size. Those employed in the present invention were labeled "F-40B" and, in the raw state were approximately 1/64-inch diameter. When these beads are heated in a preexpander subjected to high steam temperature and pressure, as is conventional, the beads expand to approximately 10 times their original size and are automatically ejected from the preexpander and collected in suitable containers. A suitable hemispherical mold is then preheated to approximately 340° F. to 350° F. by raw steam and at a pressure of 30 to 35 p.s.i. The steam is then shut off, and the mold door opened slightly which creates a slight vacuum in the mole as it begins to cool. The preexpanded lightweight beads are then blown into the mold until the predetermined quantity for a particular hemisphere size has been deposited. The beads should be deposited into the mold before the temperature drops below 210° F. The mold door is then secured again and steam applied as before until the mold temperature reaches 250° F. and at a pressure of approximately 30 pounds per square inch. By action of the steam and pressure, the beads within the mold undergo final expansion in approximately 10 seconds as they fuse to form a hemisphere shell. After molding, the steam is shut off and cold water poured on the mold to cool it to room temperature before removing the hemispherical shell. Shells formed in the manner may range between 8 and 30 inches in diameter as determined by the mold size. The stepped interlocking lips of the hemispheres 11 and 13 (FIGS. 3a and 3b) are made sharp and definite by the addition of a few raw or unexpanded polystyrene beads around the edge of the mold prior to final expansion of the beads.

Inasmuch as most conventional coating materials, i.e., most paints and lacquers, attack polystyrene, a barrier coating was required to protect the plastic to permit further coating with a conductive-type material. One suitable barrier coating employed in the present invention was formed by mixing one pound of aluminum pigment with mineral spirits to form a heavy paste consistency, and blending this paste with one-half gallon of a commercially available water-latex paint such for example Sherwin-Williams' which has been previously color-toned to the desired color. Water is added to this blend to thin the paint to the viscosity desired for spraying with a conventional spray gun. The hemispheres may be sprayed inside and out if desired or only one surface may be covered with this barrier coating. If an external conductive layer is to be employed the spheres may be assembled as shown in FIG. 1 prior to spraying with the barrier coating.

The conductive coating employed for spheres 10 must insure a sound, uniform, reflective surface with the requirements of no more than 5 ohms resistance across the sphere and the weight of the final sphere must be kept at a minimum. Thus, a thin metallic coating that can be uniformly applied was employed. Copper coatings may be formed in thin uniform layers by electroplating. However, before the hemispherical sections could be electroplated they must be made conductive. A shellac-latex-alcohol mixture was employed as a sealant for the hemispherical inner surface. This mixture was made by mixing 1 part of shellac, thinned, with 1 part of latex paint (Kem-Tone or the like), white, water-based and unthinned. After stirring to obtain a homogeneous mixture of shellac and paint, the mixture is thinned to a spraying consistency with denatured ethyl alcohol. Two coats of this sealant was applied on the inside of each polystyrene hemisphere, and after drying, followed by an optional coat of suitable epoxy paint. This paint is mixed according to the manufacturer's instructions; that is, 1 part epoxy, 1 part hardener and 1 part thinner. One heavy coat of the epoxy paint is applied over each sealant coating and a minimum of 6 hours of drying time allowed. The dried epoxy or sealed surface is then sprayed from a distance of 12 to 15 inches with a copper-lacquer mixture until a matte or rough finish is obtained. This copper-lacquer mixture is obtained by mixing 8 ounces of lacquer thinner with 4 ounces of cleaned copper powder, and after mixing well, adding 3 ounces of lacquer. Usually, two coatings, applied with a minimum of drying time between them, is sufficient to produce the dull matte finish desired. If the surface is shiny, it indicates that the copper powder is covered by a layer of lacquer and is therefore nonconductive. This coating shows little or no conductance with an ohmmeter; however, this is of no significance since the surface will still plate. No graphite or other carbon compound or semiconductors should be used since they give false return signals. When it is desired to coat only the inside of the hemispheres the exterior may be masked in a conventional manner.

Electroplating of the coated surface is accomplished by placing each hemisphere in a bowllike section of a conventional electroplating equipment frame and pumping copper sulfate plating solution into the hemisphere. The resulting electroplated hemispheres have a plated conductive surface of approximately 0.0001-inch thick and two such hemispheres are fastened together with an epoxy cement to produce the final spherical configuration. One suitable adhesive is available under the trade name of Eccobond 26 manufactured by Emerson and Cumming, Inc., Canton, Mass. As mentioned hereinbefore, spheres 10 may range in size from 8 to 30-inches diameter depending upon the size needed and the size mold employed.

For assembly, a hole is bored through the center of each of two hemispheres and an aluminum rod 15 of slightly greater length than the sphere diameter is inserted through one of the hemispheres (11) with disk spacer 21 being positioned between loop 17 on rod 15 and the hemispherical surface. An aluminum tubular member 33 is then positioned around rod 15 so as to abut the internal surface of hemisphere 11. The interlocking lips of hemispheres 11 and 13 are then coated with an epoxy cement and hemisphere 13 positioned on rod 15 so as to form a sphere with hemisphere 11. Spacer 31 is then placed on rod 15 so as to abut against hemisphere 13 and nut 19 threaded thereon to tightly compress the interlocking lips of the two hemispheres together. A pair of holes are then bored in sphere 10, using openings 25 and 27 in spacer 21 as guides to equalize the atmospheric pressure on the inside of sphere 10 with that on the outside.

Sphere 10 is then ready for launching and may be attached via loop 17 and a suitable nylon cord or the like to a suitable gas filled launching balloon.

Referring to FIG. 3b the process for making a sphere 10 with an external coating 27 of conductive material will now be described. Hemispherical sections 11 and 13 are molded and, after molding, adhesively bonded together with launching rod 15 in place as described hereinbefore to form a plastics sphere 10. The external surface of sphere 10 is then sprayed with a barrier coating and spray painted with a barrier coating as described hereinbefore. After drying of the barrier coating, a thin coating of silver paint is sprayed to completely cover the exterior surface. The silver paint employed in one example of the present invention was purchased under the trade name of Silver Paint, Electronic Grade 4817 and manufactured by the E. I. DuPont de Nemours and Company, Wilmington, Delaware. This paint is sprayed as thin as possible to form a continuous coating over the entire sphere.

It is thus seen that a new and novel process has been developed to produce novel lightweight, economical, conductive-coated, radar calibration spheres. These spheres can be produced in a variety of diameters to a 0.010-inch accuracy and can thus accommodate the frequency bands associated with any radar system. Spheres of this type are useful and needed for launch ranges, weather stations, defense installation or anywhere else that radar is used.

Although the invention has been described relative to specific embodiments and materials it is not so limited and modifications and variations in the materials and process employed will appear obvious to those skilled in the art. For example, rod 15, tubular member 33 and spacers 21 and 31 may be formed of a suitable plastics, such for example, polyvinylchloride. Sheet stock, one-sixteenth of an inch in thickness and ⅛-inch polyvinylchloride welding rod suitable for this use is available from Read Plastics, Inc., 317 Cedar Street, N.W., Washington, D.C. These spacers may also be cemented in place using Eccoband 26 as mentioned hereinbefore.

It is therefore to be understood that the invention may be practiced otherwise than as specifically described.

What is claimed as new and desired to be secured by Letters patent of the United States is:

1. A lightweight radar calibration sphere comprising:

a pair of hemispherical rigid sections joined together to form a sphere, said pair of hemispherical rigid sections being formed of a molded polystyrene foam, an elongated rod extending through both said sections, said rod being provided with a closed loop at one end and a threaded length at the other end thereof, said closed loop extending from said sphere and serving to provide attachment of said sphere to an inflatable balloon or the like, said threaded length of said rod extending through said sphere 180° from said closed loop, a tapped nut threaded onto said threaded end for maintaining said rod within said sphere, a tubular spacer disposed within said sphere and serving to receive said rod, a first disk spacer disposed about said rod between said loop and said tubular spacer, and a second disk spacer disposed between said tubular spacer and said tapped nut.

2. The lightweight radar calibration sphere of claim 1 wherein said hemispherical halves are provided with stepped interlocking surfaces and said surfaces being bonded together to form a sphere by an epoxy resin.

3. The lightweight radar calibration sphere of claim 1 including a conductive-surface coating for said sphere.

4. The lightweight radar calibration sphere of claim 3 wherein said coating is a thin layer of copper applied to the interior surface of said sphere.

5. The lightweight radar calibration sphere of claim 3 wherein said coating is a thin layer of silver applied to the exterior of said sphere.

* * * * *